(12) United States Patent
Hamadani

(10) Patent No.: US 11,322,047 B2
(45) Date of Patent: May 3, 2022

(54) SYSTEM AND METHOD FOR CREATING A POKER ALGORITHM CAPABLE OF INDEPENDENTLY PLAYING AND TRAINING USERS HOW TO PLAY CONSISTENTLY OPTIMAL POKER

(71) Applicant: Kiarash Hamadani, Los Angeles, CA (US)

(72) Inventor: Kiarash Hamadani, Los Angeles, CA (US)

( * ) Notice: Subject to any disclaimer, the term of this patent is extended or adjusted under 35 U.S.C. 154(b) by 60 days.

(21) Appl. No.: 16/522,682

(22) Filed: Jul. 26, 2019

(65) Prior Publication Data

US 2020/0410896 A1 Dec. 31, 2020

Related U.S. Application Data

(60) Provisional application No. 62/865,989, filed on Jun. 25, 2019.

(51) Int. Cl.
| | |
|---|---|
| *A63F 9/24* | (2006.01) |
| *G09B 19/22* | (2006.01) |
| *G09B 9/00* | (2006.01) |
| *G07F 17/32* | (2006.01) |

(52) U.S. Cl.
CPC .............. *G09B 19/22* (2013.01); *G09B 9/00* (2013.01); *G07F 17/3276* (2013.01); *G07F 17/3293* (2013.01)

(58) Field of Classification Search
None
See application file for complete search history.

(56) References Cited

U.S. PATENT DOCUMENTS

| | | | | |
|---|---|---|---|---|
| 7,993,191 | B2* | 8/2011 | Evans | G07F 17/3293 463/13 |
| 8,152,618 | B1* | 4/2012 | Blay | G07F 17/3272 463/13 |
| 8,246,466 | B2* | 8/2012 | Herrmann | G07F 17/32 463/42 |
| 8,734,219 | B2* | 5/2014 | Thornton | G07F 17/3237 463/13 |
| 9,928,680 | B2* | 3/2018 | Lutnick | G07F 17/32 |
| 10,223,859 | B2* | 3/2019 | Massing | G07F 17/3211 |

(Continued)

*Primary Examiner* — Sunit Pandya
(74) *Attorney, Agent, or Firm* — Concept IP LLP; Pejman Yedidsion

(57) ABSTRACT

An original system and method for solving the card game known as Texas Hold'em Poker is disclosed. Mathematical calculations as well as game theory tactics are utilized to determine the optimal strategy for any possible situation that could potentially arise in Texas Hold'em Poker, as well as other variations of poker where the methodology also applies. One embodiment of the invention involves a fully automated electronic poker simulator that would allow the user to play a complete and genuine game of electronic poker against any number of computerized or live opponents, while simultaneously utilizing features of the poker simulator to learn how to play consistently optimal poker. Another embodiment would be to utilize the unique and specific methodology described herein to develop an artificially intelligent poker algorithm that can independently play consistently optimal poker in any possible scenario.

14 Claims, 53 Drawing Sheets

Pre-Flop Hand Strength Rankings (1 - 169)

| | | | | | | | | | | |
|---|---|---|---|---|---|---|---|---|---|---|
| 1-10 | AA | KK | AKs | QQ | JJ | AKo | AQs | 1010 | AQo | KQs |
| 11-20 | AJs | 99 | KJs | QJs | A10s | 88 | KQo | AJo | J10s | Q10s |
| 21-30 | K10s | 77 | 109s | KJo | J9s | A9s | 66 | A10o | A8s | 98s |
| 31-40 | QJo | Q9s | A7s | K9s | 55 | 108s | J10o | A5s | A6s | 87s |
| 41-50 | 44 | A4s | Q10o | A3s | 33 | K10o | A2s | 22 | J8s | Q8s |
| 51-60 | 109o | 97s | 76s | J9o | A9o | 86s | K8s | 65s | A8o | k7s |
| 61-70 | 98o | 107s | Q9o | 108o | K6s | 54s | 75s | J7s | K9o | K5s |
| 71-80 | A7o | 87o | K4s | 96s | 97o | K3s | J8o | A5o | K2s | A6o |
| 81-90 | 76o | Q7s | 64s | 106s | A4o | Q8o | A3o | 85s | 86o | A2o |
| 91-100 | K8o | Q6s | 53s | 107o | 65o | K7o | 43s | Q5s | 95s | K6o |
| 101-110 | 74s | J6s | 54o | Q4s | K5o | 63s | 75o | K4o | Q3s | J5s |
| 111-120 | Q2s | K3o | 52s | 42s | 32s | K2o | 96o | 64o | J4s | 53o |
| 121-130 | 43o | J3s | 85o | J2s | Q7o | 105s | 104s | Q6o | 84s | Q5o |
| 131-140 | J7o | 103s | 73s | 102s | Q4o | 62s | 106o | Q3o | 74o | Q2o |
| 141-150 | 94s | 63o | 93s | 92s | 83s | 82s | 72s | 95o | J6o | J5o |
| 151-160 | J4o | J3o | J2o | 52o | 42o | 32o | 105o | 104o | 84o | 103o |
| 161-169 | 73o | 102o | 62o | 94o | 93o | 92o | 83o | 82o | 72o | |

* suited hands have probability = 4/1326 ~ .30%, pairs have probability = 6/1326 ~ .45%, off-suit hands have probability = 12/1326 ~ .90%
* Figure 1 is adjusted for short stacks (0 - 30 big blinds), medium stacks (30 - 70 big blinds), and super deep stacks (150+ big blinds). Ace highs are ranked higher for short stacks, suited connectors are ranked higher for deep stacks, etc.

* s means suited, o means off-suite

(56) References Cited

U.S. PATENT DOCUMENTS

| | | | |
|---|---|---|---|
| 2007/0167228 A1* | 7/2007 | Tormey | G07F 17/32 463/29 |
| 2009/0191934 A1* | 7/2009 | Larson | G07F 17/32 463/13 |
| 2011/0151956 A1* | 6/2011 | Shackleford | G07F 17/32 463/13 |
| 2013/0005421 A1* | 1/2013 | Barzilay | G07F 17/32 463/9 |
| 2014/0024427 A1* | 1/2014 | Cole | G07F 17/3293 463/13 |

* cited by examiner

Pre-Flop Hand Strength Rankings (1 - 169)

| | | | | | | | | | |
|---|---|---|---|---|---|---|---|---|---|
| *1-10* | AA | KK | AKs | QQ | JJ | AKo | AQs | 1010 | AQo | KQs |
| *11-20* | AJs | 99 | KJs | QJs | A10s | 88 | KQo | AJo | J10s | Q10s |
| *21-30* | K10s | 77 | 109s | KJo | J9s | A9s | 66 | A10o | A8s | 98s |
| *31-40* | QJo | Q9s | A7s | K9s | 55 | 108s | J10o | A5s | A6s | 87s |
| *41-50* | 44 | A4s | Q10o | A3s | 33 | K10o | A2s | 22 | J8s | Q8s |
| *51-60* | 109o | 97s | 76s | J9o | A9o | 86s | K8s | 65s | A8o | k7s |
| *61-70* | 98o | 107s | Q9o | 108o | K6s | 54s | 75s | J7s | K9o | K5s |
| *71-80* | A7o | 87o | K4s | 96s | 97o | K3s | J8o | A5o | K2s | A6o |
| *81-90* | 76o | Q7s | 64s | 106s | A4o | Q8o | A3o | 85s | 86o | A2o |
| *91-100* | K8o | Q6s | 53s | 107o | 65o | K7o | 43s | Q5s | 95s | K6o |
| *101-110* | 74s | J6s | 54o | Q4s | K5o | 63s | 75o | K4o | Q3s | J5s |
| *111-120* | Q2s | K3o | 52s | 42s | 32s | K2o | 96o | 64o | J4s | 53o |
| *121-130* | 43o | J3s | 85o | J2s | Q7o | 105s | 104s | Q6o | 84s | Q5o |
| *131-140* | J7o | 103s | 73s | 102s | Q4o | 62s | 106o | Q3o | 74o | Q2o |
| *141-150* | 94s | 63o | 93s | 92s | 83s | 82s | 72s | 95o | J6o | J5o |
| *151-160* | J4o | J3o | J2o | 52o | 42o | 32o | 105o | 104o | 84o | 103o |
| *161-169* | 73o | 102o | 62o | 94o | 93o | 92o | 83o | 82o | 72o | |

● s means suited, o means off-suite

FIG. 1A

- suited hands have probability = 4/1326 ~ .30%, pairs have probability = 6/1326 ~ .45%, off-suit hands have probability = 12/1326 ~ .90%
- Figure 1 is adjusted for short stacks (0 - 30 big blinds), medium stacks (30 - 70 big blinds), and super deep stacks (150+ big blinds). Ace highs are ranked higher for short stacks, suited connectors are ranked higher for deep stacks, etc.

FIG. 1B

Preflop initial bet Basic Optimal Strategy when facing 0 opponent raises/calls (raise size = pot size = 3.5 big blinds)

With 9 opponents behind:
    Raise = Hand Range 1 - 16 = 7.05% expected frequency
    Call = Hand Range 17 - 36 = 9.45% expected frequency
    Fold = Hand Range 37 - 169 = 83.5% expected frequency With 8 opponents behind:
    Raise = Hand Range 1 - 18 = 8.85% expected frequency
    Call = Hand Range 19 - 41 = 9.9% expected frequency
    Fold = Hand Range 42 - 169 = 81.25% expected frequency With 7 opponents behind:
    Raise = Hand Range 1 - 23 = 10.5% expected frequency
    Call = Hand Range 24 - 48 = 11.85% expected frequency
    Fold = Hand Range 47 - 169 = 78.65% expected frequency With 6 opponents behind:
    Raise = Hand Range 1 - 28 = 13.35% expected frequency
    Call = Hand Range 29 - 53 = 11.7% expected frequency
    Fold = Hand Range 54 - 169 = 74.95% expected frequency With 5 opponents behind:
    Raise = Hand Range 1 - 34 = 15.75% expected frequency
    Call = Hand Range 35 - 61 = 13.5% expected frequency
    Fold = Hand Range 62 - 169 = 70.75% expected frequency With 4 opponents behind (highjack):
    Raise = Hand Range 1 - 40 = 18.3% expected frequency
    Call = Hand Range 41 - 67 = 13.95% expected frequency

FIG. 2A

Fold = Hand Range 68 - 169 = 67.75% expected frequency

With 3 opponents behind (cutoff):

Raise = Hand Range 1 - 63 = 30.45% expected frequency

Never call

Fold = Hand Range 64 - 169 = 69.55% expected frequency

With 2 opponents behind (button):

Raise = Hand Range 1 - 72 = 35.55 expected frequency

Never Call

Fold = Hand Range 73 - 169 = 64.45% expected frequency

From small blind and out of position (raise size stays at 3.5 big blinds):

Raise = Hand Range 1 - 46 = 21.6% expected frequency

Call = Hand Range 47 - 134 = 46.65% expected frequency

Fold = Hand Range 141 - 169 = 32.75% expected frequency

From small blind and button (heads up poker, raise size adjusted to 3 big blinds):

Raise = Hand Range 1 - 61 = 29.25% expected frequency

Call = Hand Range 62 - 140 = 48.25% expected frequency

Fold = Hand Range 141 - 169 = 22.5% expected frequency

FIG. 2B

Preflop initial bet Basic Optimal Strategy when facing 1 or more opponent calls
(Early Position is any player with 7-9 opponents behind)

With 8 opponents behind:
    Raise = Hand Range 1 - 16 = 7.05% expected frequency
    Call = Hand Range 17 - 51 = 16.8% expected frequency
    Fold = Hand Range 52 - 169 = 75.45% expected frequency With 7 opponents behind:
    Raise = Hand Range 1 - 18 = 8.85% expected frequency
    Call = Hand Range 19 - 53 = 15.6% expected frequency
    Fold = Hand Range 54 - 169 = 73.15% expected frequency With 6 opponents behind:
    Raise = Hand Range 1 - 22 = 10.2% expected frequency
    Call = Hand Range 23 - 58 = 16.95% expected frequency
    Fold = Hand Range 59 - 169 = 72.85% expected frequency With 5 opponents behind and an early position opponent call:
    Raise = Hand Range 1 - 26 = 12% expected frequency
    Call = Hand Range 27 - 61 = 17.25% expected frequency
    Fold = Hand Range 62 - 169 = 70.75% expected frequency With 5 opponents behind and no early position opponent call:
    Raise = Hand Range 1 - 28 = 13.35% expected frequency
    Call = Hand Range 29 - 63 = 17.1% expected frequency
    Fold = Hand Range 64 - 169 = 69.55% expected frequency With 4 opponents behind and an early position opponent call:
    Raise = Hand Range 1 - 28 = 13.35% expected frequency

FIG. 3A

Call = Hand Range 29 - 64 = 18% expected frequency

Fold = Hand Range 65 - 169 = 68.65% expected frequency

With 4 opponents behind and no early position opponent call:

Raise = Hand Range 1 - 32 = 15.15% expected frequency

Call = Hand Range 33 - 66 = 16.8% expected frequency

Fold = Hand Range 67 - 169 = 68.05% expected frequency

With 3 opponents behind and an early position opponent call:

Raise = Hand Range 1 - 32 = 15.15% expected frequency

Call = Hand Range 33 - 67 = 17.1% expected frequency

Fold = Hand Range 68 - 169 = 67.75% expected frequency

With 3 opponents behind and no early position opponent call:

Raise = Hand Range 1 - 36 = 16.5% expected frequency

Call = Hand Range 37 - 71 = 18.15% expected frequency

Fold = Hand Range 72 - 169 = 65.35% expected frequency

With button and an early position opponent call:

Raise = Hand Range 1 - 36 = 16.5% expected frequency

Call = Hand Range 37 - 75 = 20.55% expected frequency

Fold = Hand Range 76 - 169 = 62.95% expected frequency

With button and no early position opponent call:

Raise = Hand Range 1 - 43 = 19.95% expected frequency

Call = Hand Range 44 - 80 = 20.4% expected frequency

Fold = Hand Range 81 - 169 = 59.65% expected frequency

From small blind and an early position opponent call:

Raise = Hand Range 1 - 27 = 12.45% expected frequency

Call = Hand Range 28 - 140 = 61.15% expected frequency

Fold = Hand Range 136 - 169 = 26.4% expected frequency

FIG. 3B

From small blind and no early position opponent call:

Raise = Hand Range 1 - 35 = 16.2% expected frequency

Call = Hand Range 36 - 140 = 61.3% expected frequency

Fold = Hand Range 141 - 169 = 22.5% expected frequency

From big blind and an early position opponent call:

Raise = Hand Range 1 - 28 = 13.35% expected frequency

Check = Hand Range 29 - 169 = 86.65% expected frequency

From big blind and no early position opponent call:

Raise = Hand Range 1 - 36 = 16.5% expected frequency

Check = Hand Range 37 - 169 = 83.5% expected frequency

Heads up - From big blind and opponent calls

Raise = Hand Range 1 - 58 = 27.15% expected frequency

Check = Hand Range 59 - 169 = 72.85% expected frequency

- Raise size = pot size = 3.5 big blinds + 1 big blind per opponent call
- The hand ranges above can be further optimized by distinguishing between opponent callers based on the exact number of opponents behind the caller (currently only distinguishes based on early position or non early position)
- The hand ranges above can also be further optimized by "adjusting" the ranges based on the number of opponents that have called the big blind (multiple callers will widen the raising and calling ranges).

FIG. 3C

Preflop initial Basic Optimal Strategy when facing 1 opponent raise:

With 9 opponents behind raiser (opponent Estimated Hand Range = 1 - 16 = 7.05% expected frequency):

If player has 7-8 opponents behind:

3-Bet = Hand Range 1 - 5 = 2.1% expected frequency

Call = Hand Range 6 - 18 = 6.75% expected frequency

Fold = Hand Range 19 - 169 = 91.15% expected frequency

If player has 4-6 opponents behind:

3-Bet = Hand Range 1 - 5 = 2.1% expected frequency

Call = Hand Range 6 - 22 = 8.1% expected frequency

Fold = Hand Range 23 - 169 = 89.8% expected frequency

If player has 2-3 opponents behind:

3-Bet = Hand Range 1 - 5 = 2.1% expected frequency

Call = Hand Range 6 - 27 = 10.35% expected frequency

Fold = Hand Range 28 - 169 = 87.55% expected frequency

If player is small blind:

3-Bet = Hand Range 1 - 5 = 2.1% expected frequency

Call = Hand Range 6 - 23 = 8.4% expected frequency

Fold = Hand Range 24 - 169 = 89.5% expected frequency

If player is big blind:

3-Bet = Hand Range 1 - 5 = 2.1% expected frequency

Call = Hand Range 6 - 41 =16.65% expected frequency

Fold = Hand Range 42 - 169 = 81.25% expected frequency

FIG. 4A

With 8 opponents behind raiser and no limper (opponent Estimated Hand Range = 1 - 18 = 8.85% expected frequency):

If player has 6-7 opponents behind:

3-Bet = Hand Range 1 - 6 = 3.0% expected frequency

Call = Hand Range 7 - 23 = 7.5% expected frequency

Fold = Hand Range 24 - 169 = 89.5% expected frequency

If player has 4-5 opponents behind:

3-Bet = Hand Range 1 - 6 = 3.0% expected frequency

Call = Hand Range 7 - 27 = 9.45% expected frequency

Fold = Hand Range 28 - 169 = 87.55% expected frequency

If player has 2-3 opponents behind:

3-Bet = Hand Range 1 - 7 = 3.3% expected frequency

Call = Hand Range 8 - 30 = 10.65% expected frequency

Fold =Hand Range 31 - 169 = 86.05% expected frequency

If player is small blind:

3-Bet = Hand Range 1 - 6 = 3.0% expected frequency

Call = Hand Range 7 - 27 = 9.45% expected frequency

Fold = Hand Range 28 - 169 = 87.55% expected frequency

If player is big blind:

3-Bet = Hand Range 1 - 6 = 3.0% expected frequency

Call = Hand Range 7 - 45 = 17.7% expected frequency

Fold =Hand Range 46 - 169 = 79.3% expected frequency

With 8 opponents behind raiser and yes limper (opponent Estimated Hand Range = 1 - 16 = 7.05% expected frequency): Same as "with 9 opponents behind raiser"

FIG. 4B

With 7 opponents behind raiser and no limper (opponent Estimated Hand Range = 1 - 23 = 10.5% expected frequency):

If player has 5-6 opponents behind:

3-Bet = Hand Range 1 - 8 = 3.75% expected frequency

Call = Hand Range 9 - 30 = 10.2% expected frequency

Fold = Hand Range 31 - 169 = 86.05% expected frequency

If player has 2-4 opponents behind:

3-Bet = Hand Range 1 - 8 = 3.75% expected frequency

Call = Hand Range 9 - 35 = 12.45% expected frequency

Fold = Hand Range 36 - 169 = 83.85% expected frequency

If player is small blind:

3-Bet = Hand Range 1 - 8 = 3.75% expected frequency

Call = Hand Range 9 - 30 = 10.2% expected frequency

Fold = Hand Range 31 - 169 = 86.05% expected frequency

If player is big blind:

3-Bet = Hand Range 1 - 8 = 3.75% expected frequency

Call = Hand Range 9 - 50 = 19.2% expected frequency

Fold = Hand Range 51 - 169 = 77.05% expected frequency

With 7 opponents behind raiser and yes limper (opponent Estimated Hand Range = 1 - 18 = 10.5% expected frequency): Same as "with 8 opponents behind raiser and no limper"

With 6 opponents behind raiser and no limper (opponent Estimated Hand Range = 1 - 28 = 13.35%):

If player has 4-5 opponents behind or if player is small blind:

3-Bet = Hand Range 1 - 10 = 4.95% expected frequency

FIG. 4C

Call = Hand Range 11 - 41 = 13.8% expected frequency

Fold = Hand Range 42 - 169 = 81.25% expected frequency

If player has 2-3 opponents behind:

3-Bet = Hand Range 1 - 11 = 5.25% expected frequency

Call = Hand Range 12 - 45 = 15.45% expected frequency

Fold = Hand Range 46 - 169 = 79.3% expected frequency

If player is big blind:

3-Bet = Hand Range 1 - 10 = 4.95% expected frequency

Call = Hand Range 11 - 58 = 22.2% expected frequency

Fold = Hand Range 59 - 169 = 72.15% expected frequency

With 6 opponents behind raiser and yes limper (opponent Estimated Hand Range = 1 - 22 = 10.2%): Same as "with 7 opponents behind raiser and no limper"

With 5 opponents behind raiser and no limper (opponent Estimated Hand Range = 1 - 34 = 15.75% expected frequency):

If player has 3-4 opponents behind or if player is small blind:

3-Bet = Hand Range 1 - 12 = 5.7% expected frequency

Call = Hand Range 13 - 48 = 16.65% expected frequency

Fold = Hand Range 49 - 169 = 77.65% expected frequency

If player has 2 opponents behind:

3-Bet = Hand Range 1 - 13 = 6% expected frequency

Call = Hand Range 14 - 50 = 16.95% expected frequency

Fold = Hand Range 51 - 169 = 77.05% expected frequency

If player is big blind:

3-Bet = Hand Range 1 - 12 = 5.7% expected frequency

Call = Hand Range 13 - 62 = 23.85% expected frequency

FIG. 4D

Fold = Hand Range 63 - 169 = 70.45% expected frequency

With 5 opponents behind raiser and yes limper and yes early position limper (opponent Estimated Hand Range = 1 - 26 = 12% expected frequency): Same as "with 6 opponents behind raiser and no limper"

With 5 opponents behind raiser and yes limper and no early position limper (opponent Estimated Hand Range = 1 - 28 = 13.35% expected frequency): Same as "with 6 opponents behind raiser and no limper"

With 4 opponents behind raiser and no limper (opponent Estimated Hand Range = 1 - 40 = 18.3% expected frequency):
    If player has 3 opponents behind or if player is small blind:
        3-Bet = Hand Range 1 - 15 = 6.6% expected frequency
        Call = Hand Range 16 - 51 = 17.25% expected frequency
        Fold = Hand Range 52 - 169 = 76.15% expected frequency
    If player has 2 opponents behind:
        3-Bet = Hand Range 1 - 16 = 7.05% expected frequency
        Call = Hand Range 17 - 53 = 17.4% expected frequency
        Fold = Hand Range 54 - 169 = 75.55% expected frequency
    If player is big blind:
        3-Bet = Hand Range 1 - 15 = 6.6% expected frequency
        Call = Hand Range 16 - 67 = 25.65% expected frequency
        Fold = Hand Range 68 - 169 = 67.75% expected frequency

FIG. 4E

With 4 opponents behind raiser and yes limper and yes early position limper (opponent Estimated Hand Range = 1 - 28 = 13.35% expected frequency): Same as "With 6 opponents behind raiser and no limper"

With 4 opponents behind raiser and yes limper and no early position limper (opponent Estimated Hand Range = 1 - 32 = 15.15% expected frequency): Same as "With 5 opponents behind raiser and no limper"

With 3 opponents behind raiser and no limper (opponent Estimated Hand Range = 1 - 63 = 30.45% expected frequency):
    If player has 2 opponents behind:
        3-Bet = Hand Range 1 - 21 = 9.75% expected frequency
        Call = Hand Range 22 - 56 = 16.8% expected frequency
        Fold = Hand Range 57 - 169 = 73.45% expected frequency
    If player is small blind:
        3-Bet = Hand Range 1 - 17 = 7.95% expected frequency
        Call = Hand Range 18 - 46 = 13.65% expected frequency
        Fold = Hand Range 47 - 169 = 78.4% expected frequency
    If player is big blind:
        3-Bet = Hand Range 1 - 18 = 8.85% expected frequency
        Call = Hand Range 19 - 69 = 24.6% expected frequency
        Fold = Hand Range 70 - 169 = 66.55% expected frequency With 3 opponents behind raiser and yes limper and yes early position limper (opponent Estimated Hand Range = 1 - 32 = 15.75% expected frequency): Same as "With 5 opponents behind raiser and no limper"

FIG. 4F

With 3 opponents behind raiser and yes limper and no early position limper (opponent Estimated Hand Range = 1 - 36 = 15.75% expected frequency):

If player has 2 opponents behind:

3-Bet = Hand Range 1 - 15 = 6.6% expected frequency

Call = Hand Range 16 - 51 = 17.25% expected frequency

Fold = Hand Range 52 - 169 = 76.15% expected frequency

If player is small blind:

3-Bet = Hand Range 1 - 14 = 6.3% expected frequency

Call = Hand Range 15 - 48 = 16.05% expected frequency

Fold = Hand Range 49 - 169 = 77.65% expected frequency

If player is big blind:

3-Bet = Hand Range 1 - 14 = 6.3% expected frequency

Call = Hand Range 15 - 64 = 25.05% expected frequency

Fold = Hand Range 65 - 169 = 68.65% expected frequency

With 2 opponents behind raiser and no limper (opponent Estimated Hand Range = 1 - 72 = 35.55% expected frequency) :

If player is small blind:

3-Bet = Hand Range 1 - 20 = 9.45% expected frequency

Call = Hand Range 21 - 56 = 17.1% expected frequency

Fold = Hand Range 57 - 169 = 73.45% expected frequency

If player is big blind

3-Bet = Hand Range 1 - 21 = 9.75% expected frequency

Call = Hand Range 22 - 73 = 26.1% expected frequency

Fold = Hand Range 74 - 169 = 64.15% expected frequency

FIG. 4G

With 2 opponents behind raiser and yes limper and yes early position limper (opponent Estimated Hand Range = 1 - 36 = 16.5% expected frequency): Same as "With 3 opponents behind raiser and yes limper and no early position limper"

With 2 opponents behind raiser and yes limper and no early position limper (opponent Estimated Hand Range = 1 - 43 = 19.95% expected frequency):
    If player is small blind:
        3-Bet = Hand Range 1 - 16 = 7.05% expected frequency
        Call = Hand Range 17 - 53 = 17.4% expected frequency
        Fold = Hand Range 54 - 169 = 75.55% expected frequency
    If player is big blind:
        3-Bet = Hand Range 1 - 16 = 7.05% expected frequency
        Call = Hand Range 17 - 70 = 26.7% expected frequency
        Fold = Hand Range 71 - 169 = 66.25% expected frequency With 1 opponent behind raiser who is the small blind and no limper (opponent Estimated Hand Range = 1 - 51 = 24.15% expected frequency) :
    If player is big blind:
        3-Bet = Hand Range 1 - 18 = 8.85% expected frequency
        Call = Hand Range 19 - 92 = 39.3% expected frequency
        Fold = Hand Range 93 - 169 = 51.85% expected frequency With 1 opponent behind raiser who is small blind and yes limper and yes early position limper (opponent Estimated Hand Range = 1 - 27 = 12.45% expected frequency):
    If player is big blind:
        3-Bet = Hand Range 1 - 11 = 5.25% expected frequency
        Call = Hand Range 12 - 62 = 24.3% expected frequency

FIG. 4H

Fold = Hand Range 63 - 169 = 70.45% expected frequency

With 1 opponent behind raiser who is small blind and yes limper and no early position limper (opponent Estimated Hand Range = 1 - 35 = 16.2% expected frequency):
    If player is big blind:
        3-Bet = Hand Range 1 - 14 = 6.3% expected frequency
        Call = Hand Range 15 - 67 = 25.95% expected frequency
        Fold = Hand Range 68 - 169 = 67.75% expected frequency With 1 opponent behind raiser who is the small blind and button (Heads up poker, opponent Estimated Hand Range = 1 - 61 = 29.25% expected frequency):
        3-Bet = Hand Range 1 - 19 = 9.15% expected frequency
        Call = Hand Range 20 - 90 = 37.8% expected frequency
        Fold =Hand Range 91 - 169 = 53.05% expected frequency

FIG. 4I

Calculating Weighted Average Equity

Player with 8 opponents behind has Ace of hearts and Ace of diamonds, so Player raises (pot size raise). All opponents fold except for 1, who calls from the button. The standard opponent Estimated Hand Range = 8 - 30. If the flop comes out with 5 of spades, 8 of diamonds, and King of hearts, then the player's *Weighted Average Equity* against opponent's *Estimated Hand Range* can be calculated as follows:

FIG. 5A

| Opponent Hands | Possible Combinations | Player Equity |
|---|---|---|
| 1010 | 6 | 92% |
| AQo | 6 | 98% |
| KQs | 3 | 82% |
| AJs | 2 | 98% |
| 99 | 6 | 90% |
| KJs | 3 | 82% |
| QJs | 4 | 96% |
| A10s | 2 | 94% |
| 88 | 3 | 9% |
| KQo | 9 | 82% |
| AJo | 6 | 98% |
| 10Js | 4 | 94% |
| Q10s | 4 | 96% |
| K10s | 3 | 82% |
| 77 | 6 | 88% |
| 109s | 4 | 94% |
| KJo | 9 | 82% |
| J9s | 4 | 90% |
| A9s | 2 | 98% |
| 66 | 6 | 88% |
| A10o | 6 | 98% |
| A8s | 2 | 91% |
| 98s | 3 | 80% |
| Total Hands | Total Combinations | Weighted Average Equity |
| 23 | 103 | 87% |

FIG. 5B

- 23 unique hands (103 total hand combinations) are in opponent Estimated Hand Range
- Player hand of AA has a Weighted Average Equity ~ 87% against opponent's Estimated Hand Range

FIG. 5C

Preflop Basic Optimal Strategy when facing an opponent 3-Bet
(Active Opponent is either the most recent bettor/raiser, or called the most recent bet)

1. Opponent has 3-Bet and player is the original raiser or player has called the initial raise:
    a. And player is in position against all active opponents
        i. Player 4-bets when Weighted Average Equity against active opponent Estimated Hand Range > 65%
        ii. Player Calls when Weighted Average Equity against active opponent Estimated Hand Range > 33% but < 65%
        iii. Player Folds when Weighted Average Equity against active opponent Estimated Hand Range < 33%
    b. And player is out of position against any active opponents
        i. Player 4-bets when Weighted Average Equity against active opponent Estimated Hand Range > 63%
        ii. Player Calls when Weighted Average Equity against active opponent Estimated Hand Range > 36% but < 63%
        iii. Player Folds when Weighted Average Equity against active opponent Estimated Hand Range < 36%
2. Opponent has 3-Bet and player is not the original raiser and did not call the initial raise:
    a. And player is in position against all active opponents
        i. Player 4-bets when Weighted Average Equity against active opponent Estimated Hand Range > 65%
        ii. Player Calls when Weighted Average Equity against active opponent Estimated Hand Range > 48% but < 65%

FIG. 6A iii. Player Folds when Weighted Average Equity against active opponent Estimated Hand Range < 48%
 b. And player is out of position against any active opponent
  i. Player 4-bets when Weighted Average Equity against active opponent Estimated Hand Range > 63%
  ii. Player Calls when Weighted Average Equity against active opponent Estimated Hand Range > 49% but < 63%
  iii. Player Folds when Weighted Average Equity against active opponent Estimated Hand Range < 49%

- Similar process applies for opponent 4-Bets and 5-Bets
- Exact cutoff percentages presented may require minor adjustments

FIG. 6B

General Opponent Categories

1. Loose - Opponents that consistently raise with hands they should call, and/or call with hands they should fold.
2. Optimal- Opponents that consistently fold/call/raise in line with Basic Optimal Strategy
3. Tight - Opponents that consistently call with hands they should raise, and/or fold with hands they should call.

FIG. 7

Detailed Opponent Categories

1. Loose Raiser - Opponent that consistently raises more often than optimal. Once an opponent has been identified as a loose raiser, marginally weak hands that a player would normally fold to a raise may become calls. Marginally strong hands that a player would normally call a raise may become 3-bets. Higher hand sample sizes require less deviation from expected frequencies before making an adjustment to the Basic Optimal Strategy. Looking for statistical significance.
2. Loose Bet/Raise Caller - Opponent that consistently calls bets/raises more often than optimal.
3. Loose Limper - Opponent that consistently limps in more often than optimal.
4. Loose Re-Raiser - Opponent that consistently re-raises more often than optimal
5. Loose Postflop Bettor - Opponent that consistently makes postflop bets more often than optimal.
6. Tight Raiser - Opposite of Loose Raiser
7. Tight Bet/Raise caller - Opposite of Loose Bet/Raise Caller
8. Tight Limper - Opposite of Loose Limper
9. Tight Re-Raiser - Opposite of Loose Re-Raiser
10. Tight Postflop Bettor - Opposite of Loose Postflop Bettor

- Additional detailed opponent categories may be required

FIG. 8

Adjustments to Basic Optimal Strategy

1. Adjustments for Exploitative Strategy (based on *Opponent Analysis*): Various adjustments are required, such as:
    a. Adjusting Opponent Estimated Hand Ranges
    b. Raising/calling more often against loose opponents
    c. Folding more often against tight opponents
    d. Bluffing more often against tight opponents
    e. Value betting more often against loose opponents
    f. Analysis of opponent betting statistics and exposed cards
    g. etc.

2. Adjustments for stack size: The Basic Optimal Strategy applies for a moderately deep effective stack size of around 100 big blinds at the start of a hand. Deeper or shorter effective stack sizes will require various adjustments. Some of these adjustments include:
    a. Adjustment for "Effective" stack size:
        i. If the number of active Opponents = 1,
            1. then Player Effective Stack Size = the lower chip stack size between Player and Opponent
        ii. If the number of active Opponents = 2 or more,
            1. Determine who has the lower chip stack between Player and each active Opponent
            2. Player Effective stack size = average of the Effective stack sizes against each active opponent

FIG. 9A iii. For any preflop raise, only the raising opponent is initially considered an active opponent.
1. If any opponent calls the raise, then that caller's stack size is also used to calculate the Average Effective stack size as per 2.a.ii b. Preflop Adjustments for short/medium effective stack sizes: Figures 1 through 4 and Figure 6 are adjusted based on Player's effective stack size c. Adjustment for "pot committed" decisions: If Player has already bet/raised/called with a significant enough percentage of Player's chip stack, then any subsequent decision of fold is adjusted to call d. Adjustment for "Raise or Fold" decisions: Applies to all rounds of betting except the river. If Player decision is call, under certain conditions, then decision is adjusted to either Raise or Fold.

e. Postflop Adjustment for short stacks: If player remaining stack size after the flop is more/less than a certain percentage of the pot size, then adjustments to postflop Basic Optimal Strategy raise/call/fold/check/bet ranges are required.

3. Adjustments for varying bet/raise sizes:
   a. Adjustment for Opponent preflop initial raise size that is larger than 3.5 big blinds (due to limpers)
   b. Adjustment for Opponent bet/raise size that is more/less than the default size
   c. Adjustment for varying player bet/raise sizing options

FIG. 9B

4. Adjustments for Flush/Straight Draws (only applicable on the flop and turn): Drawing hands have value based on future unknown community cards. Strong drawing hands require adjustments to the Basic Optimal Strategy. Drawing hands should be called/bet with more often than non-drawing hands with the same Weighted Average Equity. Examples include:
   a. Adjustment for Ace high flush draw: suited or offsuite
   b. Adjustment for King to Jack high flush draw: suited or offsuite
   c. Adjustment for 3 to 10 high flush draw: suited or offsuite
   d. Adjustment for open ended straight draw (4 cards in consecutive order): 2 card straight draws or 1 card straight draws
   e. Adjustment for gutshot straight draw (4 cards in consecutive order with 1 gap): 2 card straight draws or 1 card straight draws
   f. Adjustment for double gutshot straight draw (4 cards in consecutive order with 1 gap, and another 4 cards in consecutive order with 1 gap)

5. Adjustment for calling a pre-flop raise after limping in:

6. Adjustment for Antes: Ante is a fixed sum that each player is required to put into the pot prior to the start of a hand. Antes will adjust Basic Optimal Strategy by including marginally weak hands into a player's range of playable hands.

7. Adjustment for Rakes: A Rake is a fixed sum or percentage of the pot that is removed each hand. Rakes will adjust Basic Optimal Strategy by eliminating marginally weak hands from a player's range of playable hands.

8. Adjustment for bluff bets: The Weighted Average Equity calculations provide accurate thresholds for when to make value bets based on the expected value of

FIG. 9C a player's hand. However, bluff bets are also required in order to play maximally optimal poker. Particularly for drawing hands. Also particularly for postflop play where the community cards have a disproportionately lower likelihood of improving an opponent's range vs. a player's range. Also particularly for when a player's hand is at the very bottom of his Weighted Average Equity range on the river (missed draws).

9. Adjustment for randomization: In a percentage of certain marginal situations, it may be optimal to adjust the Basic Optimal Strategy decision from call to raise or from raise to call or from fold to call or from call to fold.

10. Adjustment for hand balancing: The Basic Optimal Strategy is designed to balance a mix of both strong and weak hands within any given decision range (raise/call/fold or check/bet). However, if a sufficiently wide range of hands is not available for a particular decision, then the Basic Optimal Strategy decisions may need to be adjusted.

11. Adjustment for polarized hand range situations: Certain poker hands are either significantly ahead of an opponent's hand range, or significantly behind. This polarization of a player or opponent's hand range will affect the Basic Optimal Strategy.

12. Adjustment for pre-flop pot odds and/or squeeze play raises: When multiple opponents call (pre-flop), this increases the value of marginal hands for all subsequent preflop decisions.

FIG. 9D

13. Adjustment for overcalls: For postflop decisions where there is already a call; and for pre-flop decisions when there is a 3-bet a call, then the Basic Optimal Strategy may need to be adjusted to reduce calls.

14. Adjustment for tournament bubbles: Tournament poker features pay jumps for players that reach the end phase of a tournament. These pay jumps will affect the Basic Optimal Strategy decisions by eliminating marginal hands from a player's range, particularly when a player has a less than average chip stack. While the Basic Optimal Strategy for players with a significantly above average chip stack will include more marginal hands into a player's raising range.

15. Adjustment for limp-raising preflop

16. Adjustment for table image: Against opponents that consistently adjust their decision patterns based on Opponent Analysis, a player must monitor its own table image as well as the table image of each opponent, which can result in adjustments to the Basic Optimal Strategy decisions.

17. Adjustment for opponent bet/raise sizing patterns: Opponent bet/raise sizing must be analyzed in order to identify any patterns that can be utilized to adjust the Basic Optimal Strategy decisions.

18. Adjustment for physical tells/patterns: Players must analyze all available physical patterns (tells) a particular opponent may display in order to determine when to adjust the Basic Optimal Strategy decisions. Physical tells/patterns may include but are not limited to:

FIG. 9E a. Time taken to make a decision
b. Breathing patterns
c. Physical actions
d. Heart rate
e. Pupil dilation
f. False tells
g. Etc.

FIG. 9F

Postflop Weighted Average Equity Examples

1. Hands with 90 - 100% Weighted Average Equity vs opponent Estimated Hand Range. For example, three of a kind or better on a flop with few potential opponent draws or better hands.
2. Hands with 80-90% Weighted Average Equity vs opponent Estimated Hand Range. For example, top 2 pair on a flop with some potential opponent draws/better hands.
3. Hands with 70-80% Weighted Average Equity vs opponent Estimated Hand Range. For example, bottom 2 pair on a flop with multiple potential opponent draws/better hands.
4. Hands with 60-70% Weighted Average Equity vs opponent Estimated Hand Range. For example, overpair on a flop with few potential opponent draws/better hands. Or a very strong draw (combo draw to nuts or close to nuts).
5. Hands with 50-60% Weighted Average Equity vs opponent Estimated Hand Range. For example, overpair on a flop with multiple potential opponent draws/better hands. Or a strong draw (such as nut flush draw with 2 overcards or open ended nut straight draw with 2 overcards).
6. Hands with 40-50% Weighted Average Equity vs opponent Estimated Hand Range. For example, top pair or medium draw (such as queen high flush draw or open ended straight draw without overcards).
7. Hands with 30-40% Weighted Average Equity vs opponent Estimated Hand Range. For example, middle pair or weak draws (such as gut shot straight draw with 2 overcards)

FIG. 10A

8. Hands with 20-30% Weighted Average Equity vs opponent Estimated Hand Range. For example, bottom pair or underpair or very weak draws (such as gut shot straight draw with no overcards)
9. Hands with 10-20% Weighted Average Equity vs opponent Estimated Hand Range. For example, 1 high card and 1 low card with no pair/draw.
10. Hands with 0 - 10% Weighted Average Equity vs opponent Estimated Hand Range. For example, 2 low cards with no pair/draw.

FIG. 10B

Basic Optimal Strategy Default Bet/Raise Sizing

1. Pre-flop - Pot size raise (3.5 big blinds for initial raise + 1 additional big blind for each limper)
2. Flop - ⅔ Pot size bets/raises
3. Turn - ½ Pot size bets/raises
4. River - 40% Pot size bets/raises

FIG. 11

Postflop Basic Optimal Strategy Outline

Flop Initial Decision:

With 1 opponent:
1. And player is the preflop raiser
   a. And player is first to act
      i. Bet with WAE = 0 - 100% (bet all hands)
   b. And player is second to act
      i. And opponent checks
         1. Bet with WAE 0 - 100%
      ii. And opponent bets
         1. Opponent hands with WAE = 0 to 25% have flop discount factor = 0
         2. Opponent hands with WAE = 25 to 40% have flop discount factors = from 0 to 1
         3. Opponent hands with WAE = 40 to 75% have flop discount factors = 1
         4. Opponent hands with WAE = 75 to 100% have flop discount factors = from 1 to .5
         5. After modifying opponent estimated range as above:
            a. Call with WAE = 85-100% or 30-60%
            b. Raise with WAE = 60-85%
            c. Fold with WAE = 0-30%

FIG. 12A

2. And opponent is the preflop raiser
   a. And player is first to act
      i. Check with WAE = 0 to 100% (check all hands)
   b. And opponent is first to act
      i. And opponent checks (Non-GTO decision)
         1. Opponent hands with WAE = 0 - 40% have flop discount factors = 1
         2. Opponent hands with WAE = 40 - 57.5% have flop discount factors = from 1 to .5
         3. Opponent hands with WAE = 57.5 - 75% have flop discount factors = from .5 to 1
         4. Opponent hands with WAE = 75 - 100% have flop discount factors = 1
         5. After modifying opponent estimated range as above:
            a. Bet with WAE = 35 - 90%
            b. Check with WAE = 0 - 35% or 90 - 100%
      ii. And opponent bets
         1. Opponent Estimated Hand Range is not modified
            a. Call with WAE = 86-100% or 32-62%
            b. Raise with WAE = 62-86%
            c. Fold with WAE = 0-32%
3. And there is no preflop raiser
   a. And player is first to act
      i. Bet with WAE = 35 - 85%
      ii. Check with WAE = 0 - 35% or 85 - 100%
   b. And opponent is first to act
      i. And opponent checks

FIG. 12B

1. Opponent hands with WAE = 0 - 35% have flop discount factors = 1
2. Opponent hands with WAE = 35% - 60% have flop discount factors = from 1 to .5
3. Opponent hands with WAE = 60% - 85% have flop discount factors = from .5 to 1
4. Opponent hands with WAE = 85% - 100% have flop discount factors = 1
5. After modifying opponent estimated range as above:
   a. Bet with WAE = 33 - 87%
   b. Check with WAE = 0 -33% or 87 -100% ii. And opponent bets
   1. Opponent hands with WAE = 0 - 25% have flop discount factors = 0
   2. Opponent hands with WAE = 25% - 35% have flop discount factors = from 0 to 1
   3. Opponent hands with WAE = 35% - 85% have flop discount factors = 1
   4. Opponent hands with WAE = 85% - 100% have flop discount factors = from 1 to .5
   5. After modifying opponent's estimated range as above:
      a. Call with WAE = 86-100% or 33-63%
      b. Raise with WAE = 63-86%
      c. Fold with WAE = 0-33%

FIG. 12C

With 2 opponents total: Calculate player's WAE against each active opponent's range. Opponents are numbered in order of position (i.e. first opponent to act is Opponent 1, second opponent to act is opponent 2, etc). Active opponent = the most recent bettor/raiser, and any callers. If no opponent has bet/raised (only checks or no action), then all opponents in the hand are active.

1. And player is the preflop raiser:
   a. And player is first to act
      i. Check with average WAE = 0 to 37% or 85 to 100%
      ii. Bet with average WAE = 37 to 85%
   b. And player is second to act
      i. And opponent 1 checks - Opponent 1 hand range is not modified
         1. Check with average WAE = 0 to 36% or 86 to 100%
         2. Bet with average WAE = 36 to 86%
      ii. And opponent 1 bets
         1. Opponent 1 hands with average WAE = 0 - 30% have flop discount factors = 0
         2. Opponent 1 hands with average WAE = 30% - 45% have flop discount factors = from 0 to 1
         3. Opponent 1 hands with average WAE = 45% - 85% have flop discount factors = 1
         4. Opponent 1 hands with average WAE = 85% - 100% have flop discount factors = from 1 to .5
         5. After modifying opponent 1 estimated range as above:
            a. Call with WAE (against bettor) = 87.5-100% or 35-65%
            b. Raise with WAE = 65-87.5%
            c. Fold with WAE = 0-35%

FIG. 12D c. And player is third/last to act
   i. And opponent 1 checks
      1. Opponent 1 hands with average WAE = 0 - 40% have flop discount factors = 1
      2. Opponent 1 hands with average WAE = 40 - 62.5% have flop discount factors = from 1 to .5
      3. Opponent 1 hands with average WAE = 62.5 - 85% have flop discount factors = from .5 to 1
      4. Opponent 1 hands with average WAE = 85 - 100% have flop discount factors = 1
   ii. And opponent 1 checks and opponent 2 checks
      1. Opponent 2 hands with average WAE = 0 - 39% have flop discount factors = 1
      2. Opponent 2 hands with average WAE = 39 - 59.5% have flop discount factors = from 1 to .5
      3. Opponent 2 hands with average WAE = 59.5 - 80% have flop discount factors = from .5 to 1
      4. Opponent 2 hands with average WAE = 80 - 100% have flop discount factors = 1
      5. After modifying opponent 1 & 2 estimated ranges as above:
         a. Check with average WAE = 0 - 35% or 90 - 100%
         b. Bet with average WAE = 35 - 90%
   iii. And opponent 1 checks and opponent 2 bets
      1. Opponent 2 hands with average WAE = 0 - 30% have flop discount factors = 0

FIG. 12E

2. Opponent 2 hands with average WAE = 30% - 39% have flop discount factors = from 0 to 1
3. Opponent 2 hands with average WAE = 39% - 80% have flop discount factors = 1
4. Opponent 2 hands with average WAE = 80% - 100% have flop discount factors = from 1 to .5
5. After modifying opponent 1 & 2 estimated ranges as above:
   a. Call with average WAE = 85-100% or 33-60%
   b. Raise with average WAE = 60-85%
   c. Fold with average WAE = 0-33% iv. And opponent 1 bets
1. Opponent 1 hands with average WAE = 0 - 25% have flop discount factors = 0
2. Opponent 1 hands with average WAE = 25% - 40% have flop discount factors = from 0 to 1
3. Opponent 1 hands with average WAE = 40% - 85% have flop discount factors = 1
4. Opponent 1 hands with average WAE = 85% - 100% have flop discount factors = from 1 to .5 v. And opponent 1 bets and opponent 2 calls
1. Opponent 2 hands with WAE (against bettor) = 0 - 30% have flop discount factors = 0
2. Opponent 2 hands with WAE = 30 - 40% have flop discount factors = from 0 to 1
3. Opponent 2 hands with WAE = 40 - 100% have flop discount factors = 1

FIG. 12F

4. After modifying opponent 1 & 2 estimated ranges as above:
   a. Call with average WAE = 90-100% or 35-60%
   b. Raise with average WAE = 60-90%
   c. Fold with average WAE = 0-35% vi. And opponent 1 bets and opponent 2 raises
   1. Opponent 2 hands with WAE = 0 - 40% have flop discount factors = 0
   2. Opponent 2 hands with WAE = 40 - 60% have flop discount factors = from 0 to 1
   3. Opponent 2 hands with WAE = 60 - 100% have flop discount factors = 1
   4. After modifying opponent 1 & 2 estimated ranges as above:
      a. Call with WAE (against raiser) = 80 to 100% or 40 - 60%
      b. Raise with WAE = 60 to 80%
      c. Fold with WAE = 0 to 40%

2. And opponent is the pre-flop raiser:
   a. And player is first to act with Opponent 1 as the raiser
      i. Check with all hands
   b. And player is first to act with Opponent 2 as the raiser
      i. Check with average WAE = 0 to 40% or 85 to 100%
      ii. Bet with average WAE = 40 to 85%
   c. And player is second to act with Opponent 1 as the raiser
      i. And opponent 1 checks
         1. Opponent 1 hands with average WAE = 0 - 40% have flop discount factors = 1

FIG. 12G

2. Opponent 1 hands with average WAE = 40% - 60% have flop discount factors = from 1 to .5
3. Opponent 1 hands with average WAE = 60% - 80% have flop discount factors = from .5 to 1
4. Opponent 1 hands with average WAE = 80% - 100% have flop discount factors = 1
5. After modifying opponent 1 estimated range as above:
    a. Check with average WAE = 0 to 40% or 90 - 100%
    b. Bet with average WAE = 40 - 90% ii. And opponent 1 bets
1. Opponent 1 hands with average WAE = 0 - 20% have flop discount factors = .5
2. Opponent 1 hands with average WAE = 20 - 30% have flop discount factors = from .5 to 1
3. Opponent 1 hands with average WAE = 30% - 100% have flop discount factors = 1
4. After modifying opponent 1 estimated range as above:
    a. Call with WAE (against bettor) = 37.5 - 65% or 87.5 - 100%
    b. Raise with WAE = 65 - 87.5%
    c. Fold with WAE = 0 - 37.5% d. And player is second to act with Opponent 2 as the raiser
i. And opponent 1 checks
1. Same as 1.c.i
2. After modifying opponent 1 estimated range as above:
    a. Check with average WAE = 0 to 39% or 80 - 100%
    b. Bet with average WAE = 39 - 80%

FIG. 12H ii. And opponent 1 bets
  1. Opponent 1 hands with average WAE = 0 - 20% have flop discount factors = 0
  2. Opponent 1 hands with average WAE = 20% - 35% have flop discount factors = from 0 to 1
  3. Opponent 1 hands with average WAE = 35% - 90% have flop discount factors = 1
  4. Opponent 1 hands with average WAE = 90% - 100% have flop discount factors = from 1 to .5
  5. After modifying opponent 1 estimated range as above:
     a. Call with WAE (against bettor) = 40 - 65% or 85 - 100%
     b. Raise with WAE = 65 - 85%
     c. Fold with WAE = 0 - 40%
e. And player is third to act with Opponent 1 as the raiser
  i. And opponent 1 checks
    1. Opponent 1 hands with average WAE = 0 - 45% have flop discount factors = 1
    2. Opponent 1 hands with average WAE = 45% - 62.5% have flop discount factors = from 1 to .5
    3. Opponent 1 hands with average WAE = 62.5% - 80% have flop discount factors = from .5 to 1
    4. Opponent 1 hands with average WAE = 80% - 100% have flop discount factors = 1
  ii. And opponent 1 checks and opponent 2 checks
    1. Opponent 2 hands with average WAE = 0 - 40% have flop discount factors = 1

FIG. 12I

2. Opponent 2 hands with average WAE = 40 - 60% have flop discount factors = from 1 to .5
3. Opponent 2 hands with average WAE = 60 - 80% have flop discount factors = from .5 to 1
4. Opponent 2 hands with average WAE = 80 - 100% have flop discount factors = 1
5. After modifying opponent 1 & 2 estimated ranges as above:
   a. Check with average WAE = 0 to 35% or 90 - 100%
   b. Bet with average WAE = 35 - 90% iii. And opponent 1 checks and opponent 2 bets
1. Opponent 2 hands with WAE = 0 - 20% have flop discount factors = 0
2. Opponent 2 hands with WAE = 20% - 40% have flop discount factors = from 0 to 1
3. Opponent 2 hands with WAE = 40% - 90% have flop discount factors = 1
4. Opponent 2 hands with WAE = 90% - 100% have flop discount factors = from 1 to .5
5. After modifying opponent 1 & 2 estimated ranges as above:
   a. Call with average WAE = 90-100% or 35-60%
   b. Raise with average WAE = 60-90%
   c. Fold with average WAE = 0-35% iv. And opponent 1 bets
1. Opponent 1 hands with average WAE = 0 - 20% have flop discount factors = .5
2. Opponent 1 hands with average WAE = 20% - 35% have flop discount factors = from .5 to 1

FIG. 12J

3. Opponent 1 hands with average WAE = 35% - 100% have flop discount factors = 1
v. And opponent 1 bets and opponent 2 calls
1. Opponent 2 hands with average WAE = 0 - 25% have flop discount factors = 0
2. Opponent 2 hands with average WAE = 25% - 40% have flop discount factors = from 0 to 1
3. Opponent 2 hands with average WAE = 40% - 85% have flop discount factors = 1
4. Opponent 2 hands with average WAE = 85% - 100% have flop discount factors = from 1 to .5
5. After modifying opponent 1 & 2 estimated ranges as above:
   a. Call with average WAE = 90-100% or 35-60%
   b. Raise with average WAE = 60-90%
   c. Fold with average WAE = 0-35%
vi. And opponent 1 bets and opponent 2 raises
1. Opponent 2 hands with average WAE = 0 - 35% have flop discount factors = 0
2. Opponent 2 hands with average WAE = 35% - 55% have flop discount factors = from 0 to 1
3. Opponent 2 hands with average WAE = 55% - 100% have flop discount factors = 1
4. After modifying opponent 1 & 2 estimated ranges as above:
   a. Call with average WAE = 80-100% or 40-60%
   b. Raise with average WAE = 60-80%
   c. Fold with average WAE = 0-40%

FIG. 12K f. And player is third to act with Opponent 2 as the raiser
   i. And Opponent 1 checks - no change to Opponent 1 estimated range
   ii. And Opponent 1 checks and Opponent 2 checks
      1. Opponent 2 hands with average WAE = 0 - 40% have flop discount factors = 1
      2. Opponent 2 hands with average WAE = 40% - 60% have flop discount factors = from 1 to .5
      3. Opponent 2 hands with average WAE = 60% - 80% have flop discount factors = from .5 to 1
      4. Opponent 2 hands with average WAE = 80% - 100% have flop discount factors = 1
      5. After modifying opponent 1 & 2 estimated ranges as above:
         a. Check with average WAE = 0 to 40%
         b. Bet with average WAE = 40 - 100%
   iii. And Opponent 1 checks and Opponent 2 bets
      1. Opponent 2 hands with average WAE = 0 - 20% have flop discount factors = 0
      2. Opponent 2 hands with average WAE = 20% - 35% have flop discount factors = from 0 to 1
      3. Opponent 2 hands with average WAE = 35% - 100% have flop discount factors = 1
      4. After modifying opponent 1 & 2 estimated ranges as above:
         a. Call with average WAE = 85-100% or 35-60%
         b. Raise with average WAE = 60-85%
         c. Fold with average WAE = 0-35%
   iv. And Opponent 1 bets

FIG. 12L

1. Opponent 1 hands with average WAE = 0 - 25% have flop discount factors = 0
2. Opponent 1 hands with average WAE = 25% - 40% have flop discount factors = from 0 to 1
3. Opponent 1 hands with average WAE = 40% - 80% have flop discount factors = 1
4. Opponent 1 hands with average WAE = 80% - 100% have flop discount factors = from 1 to .5 v. And Opponent 1 bets and Opponent 2 calls
  1. Opponent 2 hands with WAE (against bettor) = 0 - 25% have flop discount factors = 0
  2. Opponent 2 hands with WAE = 25% - 35% have flop discount factors = from 0 to 1
  3. Opponent 2 hands with WAE = 35% - 100% have flop discount factors = 1
  4. After modifying opponent 1 & 2 estimated ranges as above:
     a. Call with average WAE = 85-100% or 35-60%
     b. Raise with average WAE = 60-85%
     c. Fold with average WAE = 0-35% vi. And Opponent 1 bets and Opponent 2 raises
  1. Opponent 2 hands with WAE (against bettor) = 0 - 35% have flop discount factors = 0
  2. Opponent 2 hands with WAE = 35% - 55% have flop discount factors = from 0 to 1
  3. Opponent 2 hands with WAE = 55% - 100% have flop discount factors = 1
  4. After modifying opponent 1 & 2 estimated ranges as above:

FIG. 12M a. Call with WAE (against raiser) = 80-100% or 45-65% b. Raise with WAE = 65-80% c. Fold with WAE = 0-45%

3. And there is no preflop raiser:

a. And player is first to act i. Bet with average WAE = 39 - 83% ii. Check with average WAE = 0 - 39% or 83 - 100% b. And player is second to act and Opponent 1 checks i. Opponent 1 hands with average WAE = 0 - 39% and 83% - 100% have flop discount factors = 1 ii. Opponent 1 hands with average WAE = 39% - 61% have flop discount factors = from 1 to .5 iii. Opponent 1 hands with average WAE = 61% - 83% have flop discount factors = from .5 to 1 iv. After modifying opponent estimated range as above:

1. Bet with average WAE = 37 - 85%

2. Check with average WAE = 0 -37% or 85 -100% c. And player is second to act and Opponent 1 bets i. Opponent 1 hands with WAE = 0-30% have flop discount factors =0 ii. Opponent 1 hands with WAE = 30 - 39% have flop discount factors = from 0 to 1 iii. Opponent 1 hands with WAE = 39 - 83% have flop discount factors = 1 iv. Opponent 1 hands with WAE = 83 - 100% have flop discount factors = from 1 to .5 v. After modifying opponent 1 estimated range as above:

1. Call with WAE (against bettor) = 85-100% or 35-60%

FIG. 12N

2. Raise with WAE = 60-85%
3. Fold with WAE = 0-35% d. And player is third to act and Opponent 1 checks
   i. Same as 3.b.i
   ii. Same as 3.b.ii
   iii. Same as 3.b.iii
   iv. After modifying opponent 1 estimated range as above, if Opponent 2 checks:
      1. Opponent 2 hands with average WAE = 0 - 35% have flop discount factors = 1
      2. Opponent 2 hands with average WAE = 35% - 61.25% have flop discount factors = from 1 to .5
      3. Opponent 2 hands with average WAE = 61.25% - 87.5% have flop discount factors = from .5 to 1
      4. Opponent 2 hands with average WAE = 87.5% - 100% have flop discount factors = 1
      5. After modifying opponent 1 & 2 estimated ranges as above:
         a. Check with average WAE = 0 to 33% and 89 - 100%
         b. Bet with average WAE = 33 - 89%
   v. And Opponent 1 checks and Opponent 2 bets
      1. Opponent 2 hands with average WAE = 0 - 25% have flop discount factors = 0
      2. Opponent 2 hands with average WAE = 25% - 35% have flop discount factors = from 0 to 1
      3. Opponent 2 hands with average WAE = 35% - 87.5% have flop discount factors = 1

FIG. 12O

4. Opponent 2 hands with average WAE = 87.5% - 100% have flop discount factors = from 1 to .5
5. After modifying opponent 1 & 2 estimated ranges as above:
    a. Call with WAE (against bettor) = 85-100% or 35-60%
    b. Raise with WAE = 60-85%
    c. Fold with WAE = 0-35% e. And player is third to act and Opponent 1 bets
   i. Same as 3.c.i
   ii. Same as 3.c.ii
   iii. Same as 3.c.iii
   iv. Same as 3.c.iv
   v. After modifying opponent 1 estimated range as above, if Opponent 2 calls:
      1. Opponent 2 hands with WAE (against bettor) = 0 - 30% have flop discount factors = 0
      2. Opponent 2 hands with WAE = 30% - 35% have flop discount factors = from 0 to 1
      3. Opponent 2 hands with WAE = 35% - 60% have flop discount factors = 1
      4. Opponent 2 hands with WAE = 60% - 75% have flop discount factors = from 1 to .5
      5. Opponent 2 hands with WAE = 75% - 85% have flop discount factors = from .5 to 1
      6. Opponent 2 hands with WAE = 85% - 100% have flop discount factors = 1
      7. After modifying opponent 1 & 2 estimated ranges as above:

FIG. 12P a. Call with average WAE = 85-100% or 35-65%
b. Raise with average WAE = 65-85%
c. Fold with average WAE = 0-35% vi. After modifying opponent 1 estimated range as above, if Opponent 2 raises:

1. Opponent 2 hands with WAE (against bettor) = 0 - 35% have flop discount factors = 0
2. Opponent 2 hands with WAE = 35% - 60% have flop discount factors = from 0 to 1
3. Opponent 2 hands with WAE = 60% - 85% have flop discount factors = 1
4. Opponent 2 hands with WAE = 85% - 100% have flop discount factors = from 1 to .5
5. After modifying opponent 1 & 2 estimated ranges as above:
   a. Call with WAE (against raiser) = 90-100% or 40-70%
   b. Raise with WAE = 70-90%
   c. Fold with WAE = 0-40%

- Similar process applies for Flop decisions with 3 or more opponents. As well as for Flop Secondary (non-initial) decisions, Turn decisions, and River decisions
- Weighted Average Equity ranges may require minor revisions

FIG. 12Q

Opponent *Estimated Hand Range* Revision Process

Player raises with 8 opponents behind (Hand Range 1 - 18) and gets called by 1 opponent from late position (Hand Range 8 - 30). Player's hand is Ace of hearts and Ace of diamonds. Flop comes out with 5 of spades, 8 of diamonds, K of hearts. Player's Weighted Average Equity vs opponent's preflop Estimated Hand Range ~ 87% (as per Figure 5). Basic Optimal Strategy would be for Player to bet ⅔ pot size on the flop (as per Figure 11). If Opponent calls the flop bet, then Opponent hands with WAE = 85% - 100% and 30% - 60% have flop discount factor = 1 (as per Figure 12). Other opponent hands would have flop discount factors between 1 and 0. Revised Opponent Estimated Hand Range would be calculated as follows:

FIG. 13A

| Hands 8 - 30 | Possible Combinations | WAE against Hands 1 - 18 | Flop approx. Discount Factor | Discounted Likelihood | Adjusted Likelihood |
|---|---|---|---|---|---|
| 1010 | 6 | TBD | .75 | 4.37% | 10.43% |
| AQo | 6 | " | 0 | 0.00% | 0.00% |
| KQs | 3 | | 1 | 2.91% | 6.95% |
| AJs | 2 | | 0 | 0.00% | 0.00% |
| 99 | 6 | | .5 | 2.91% | 6.95% |
| KJs | 3 | | 1 | 2.91% | 6.95% |
| QJs | 4 | | 0 | 0.00% | 0.00% |
| A10s | 2 | | 0 | 0.00% | 0.00% |
| 88 | 3 | | 1 | 2.91% | 6.95% |
| KQo | 9 | | 1 | 8.74% | 20.85% |
| AJo | 6 | | 0 | 0.00% | 0.00% |
| 10Js | 4 | | 0 | 0.00% | 0.00% |
| Q10s | 4 | | 0 | 0.00% | 0.00% |
| K10s | 3 | | 1 | 2.91% | 6.95% |
| 77 | 6 | | .25 | 1.46% | 3.48% |
| 109s | 4 | | 0 | 0.00% | 0.00% |
| KJo | 9 | | 1 | 8.74% | 20.85% |
| J9s | 4 | | 0 | 0.00% | 0.00% |
| A9s | 2 | | 0 | 0.00% | 0.00% |
| 66 | 6 | | .2 | 1.17% | 2.78% |
| A10o | 6 | | 0 | 0.00% | 0.00% |
| A8s | 2 | | 0 | 0.00% | 0.00% |
| 98s | 3 | | 1 | 2.91% | 6.95% |
| | total | | | total | total |
| | 103 | | | .419 | 100% |

FIG. 13B

- Revised Opponent Estimated Hand Range after flop (arranged in order of adjusted likelihood) = KQo, KJo, 1010, KQs, 99, KJs, 88, K10s, 98s, 77, 66
- Discounted Likelihood = (Possible Combinations * Flop discount Factor) / Total Possible Combinations
- Adjusted Likelihood = Discounted Likelihood / Total Discounted Likelihoods

FIG. 13C

Poker Simulator/Trainer Features

1. User ability to customize the poker game based on factors that may include but are not limited to:
    a. Number of opponents
    b. Opponent playing styles that may include but are not limited to
        i. Loose
        ii. Tight
        iii. Basic Optimal
        iv. Exploitative Optimal
        v. Unknown (randomly selected)
    c. Player/Opponent stack sizes that may include but are not limited to
        i. Short stack size
        ii. Medium stack size
        iii. Deep stack size
    d. Rakes or Antes
    e. Tournament Poker mode
2. User ability to play a complete and genuine game of poker against live and/or computerized opponents, while simultaneously learning the detailed process for playing consistently optimal poker.

FIG. 14

SYSTEM AND METHOD FOR CREATING A POKER ALGORITHM CAPABLE OF INDEPENDENTLY PLAYING AND TRAINING USERS HOW TO PLAY CONSISTENTLY OPTIMAL POKER

CROSS REFERENCE TO RELATED APPLICATIONS

Provisional Patent Application #152865989 filed on Jun. 25, 2019

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not Applicable

FIELD OF THE INVENTION

The invention's field relates to a system and method for developing an optimal strategy for playing various forms of Poker, utilizing a wide range of mathematical calculations and game theory tactics.

BACKGROUND OF THE INVENTION

The game of Poker, and Texas Hold'em Poker in particular, has gained tremendous popularity in recent decades. Part of the appeal of the game is the combination of both luck and skill that is required to win. In the short run, luck is the primary factor that determines who wins and who loses each hand. However, players with superior strategy and skills will win in the long run. This has driven many professional and recreational poker players to seek out effective methods of improving their poker skills.

Various training methods aimed at improving user poker skills are widely available. Countless books and online tutorials exist with an array of varying poker strategies and guidelines. There are also a number of proprietary poker training methods that have been granted patents in recent years. The closest published patent application to the current invention is Patent # U.S. Pat. No. 8,152,618 B1 (Advancements in Computerized Poker Training and Analysis, Blay et al). This prior art application is primarily limited as follows:

1. The method and system disclosed can generally only be applied to a pre-determined field of potential poker scenarios. This limitation inhibits users from being able to play a complete game of genuine poker while they learn the optimal poker decision making process.

2. The method and system disclosed is often dependent on poker strategy advice from human professionals. As such, the process is not fully automated and provides little certainty regarding the accuracy of said professional advice.

There have also been various computerized Texas Hold'em Poker algorithms created in recent years. These algorithms primarily utilize some form of Counterfactual Regret Minimization in which the algorithm learns from millions of iterations of playing poker against itself in order to learn the optimal decisions in every possible scenario.

However, due to the high degree of complexity inherent to optimal Texas Hold'em Poker strategy (particularly multiplayer No Limit Hold'em), to date no one has been capable of developing a fully automated algorithm that can play and train users in playing consistently optimal Texas Hold'em Poker in any possible scenarios, and against any number of opponents. While there are various Poker training softwares currently available, none of these softwares allow a user to play a complete game of genuine no limit hold'em poker against any number of opponents during a fully automated training process.

Furthermore, the existing poker algorithms that utilize Counterfactual Regret Minimization involve highly complex mathematical calculations that inhibit everyday individuals from being capable of performing the processes involved. Whereas the methodology presented herein is simple enough that everyday individuals (with proper training) would be capable of learning how to play consistently optimal Texas Hold'em Poker in any possible scenarios. Therefore, this invention is a significant improvement upon the existing art in this field.

BRIEF DESCRIPTION OF THE DRAWINGS

FIGS. 1A-1B describe the 169 unique Texas Hold'em starting hands and ranks each hand in order of strength.

FIGS. 2A-2B describe the Basic Optimal Strategy fora player's initial preflop decision to raise/call/fold assuming 0 opponents have voluntarily entered the hand. FIGS. 2A-2B also describe the Expected Frequencies of various initial raise/call/fold decisions when 0 opponents have voluntarily entered the hand.

FIGS. 3A-3C describe the Basic Optimal Strategy for a player's initial preflop decision to raise/call/fold after 1 or more opponents call the big blind. FIGS. 3A-3C also describe the Expected Frequencies of various initial raise/call/fold decisions when facing 1 or more opponent calls.

FIGS. 4A-4I describe the Basic Optimal Strategy for a player's initial preflop decision to raise/call/fold after 1 opponent has made a pot sized raise. FIGS. 4A-4I also describe the Expected Frequencies of all possible initial raise/call/fold decisions when facing an opponent raise.

FIGS. 5A-5C describe the process for calculating a particular hand's Weighted Average Equity against an opponent's Estimated Hand Range.

FIGS. 6A-6B describe the Basic Optimal Strategy for a player's decision to raise/call/fold after an opponent 3-Bet.

FIG. 7 describes 3 general categories of opponents.

FIG. 8 describes various detailed categories of opponents.

FIGS. 9A-9F describe various Adjustments to the Basic Optimal Strategy that are required in order to play consistently optimal Texas Hold'em Poker.

FIGS. 10A-10B describe various postflop examples of hands with Weighted Average Equity ranging from 0-100%

FIG. 11 describes the Basic Optimal Strategy default bet/raise sizes

FIGS. 12A-12Q provide a detailed outline of the Basic Optimal Strategy for a Player's initial decision after the flop, and other postflop decisions.

FIGS. 13A-13C describe the process for revising an opponent estimated hand range based on opponent decisions, and determining updated opponent hand likelihood weightings.

FIG. 14 describes various features of one embodiment of the invention involving a Poker Simulator/Trainer.

DETAILED DESCRIPTION OF THE INVENTION

Described herein is a unique system and method for solving the various forms of Texas Hold'em Poker, and developing an optimal strategy that can be applied to any possible situation that could potentially arise while playing any variation of Texas Hold'em Poker and against any number of opponents. The most complex form of Texas Hold'em Poker is No Limit at a full table (generally 9 or 10 players total). Therefore this summary will focus on No limit Texas Hold'em at a full table. However, this same methodology can be applied to various other forms of Poker that include but are not limited to Limit Hold'em, Short Deck, and Omaha. The same methodology also applies against any number of opponents.

In Texas Hold'Em there are 169 unique starting hands that a player can be dealt (without distinguishing between different suits). The optimal decisions (raise/call/fold or check/bet) are determined based on detailed statistical calculations and game theory considerations. FIGS. 1A-1B rank all 169 unique Texas Hold'em starting hands in order of strength. This hand strength ranking will be used to determine a specific Basic Optimal Strategy in any possible situation. FIGS. 1A-1B are based on effective stack sizes of around 100 big blinds.

FIGS. 2A-2B describe the Basic Optimal Strategy for a player's initial preflop decision to raise/call/fold, assuming 0 opponents have voluntarily entered the hand. FIGS. 2A-2B also describe the Expected Frequencies of various initial raise/call/fold decisions when the player is the initial bettor.

To avoid giving away the strength of any hand, all preflop raises should have a default sizing relative to the pot size. Assuming players have effective stack sizes around 100 big blinds, all preflop raises should be pot sized bets (initial raise size=3.5 big blinds). Shorter stack sizes may require smaller than pot raise sizing. Deeper stack sizes may require larger than pot raise sizing.

The next step is to determine how to handle opponent raises/calls. This is where Opponent Analysis (information gathered by observing opponent behavior) becomes crucial to making maximally optimal decisions. Assuming it is the first hand of play and there is no Opponent Analysis available, FIGS. 3A-3C outline the Basic Optimal Strategy for a player's initial preflop decision to raise/call/fold after 1 or more opponents have called the big blind. FIGS. 3A-3C also describe the Expected Frequencies of various initial raise/call/fold decisions in hands where 1 or more opponents have called the big blind.

Similarly, FIGS. 4A-4I describe the Basic Optimal Strategy for a player's initial preflop decision to raise/call/fold, after 1 Opponent has made a pot size raise. FIGS. 4A-4I also describe the Expected Frequencies of various initial raise/call/fold decisions in hands where 1 opponent has raised.

As specified in FIGS. 2A-2B, 3A-3C, and 4A-4I, there is a range of hands where Basic Optimal Strategy advises a particular preflop decision (fold/call/raise). Below are 3 examples that will help illustrate how to utilize the data from FIGS. 1A-4I to determine an opponent's Estimated Hand Range in a given situation:

1. Player is on the button (2 opponents behind) and all opponents fold to Player. Basic Optimal Strategy would be for Player to raise with all hands ranging from AA (Hand 1) down to 78o (Hand 72). Therefore, if Player raises, then Player's Estimated Hand Range=1 to 72.
2. Player raises with 8 opponents behind (no limpers), and opponent calls from the button. Player's Estimated Hand Range=1 to 18, and opponent's Estimated Hand Range=8 to 30.
3. Player raises with 8 opponents behind (no limpers), and opponent 3-bets from the button. Opponent's Estimated<Hand Range=1 to 7.

Once a player has determined an opponent's Estimated Hand Range in a particular situation, a player can also determine their own hand's Weighted Average Equity against the opponent Estimated Hand Range. FIGS. 5A-5C provide a detailed example of how to calculate a hand's Weighted Average Equity against an opponent Estimated Hand Range.

A hand's Weighted Average Equity is revised after almost every opponent decision, and will be the primary factor in determining the Basic Optimal Strategy throughout all postflop decisions. A player can also determine their own estimated hand range's Weighted Average Equity against each hand within an opponent's Estimated Hand Range (player's range vs opponent's range).

The next step is to determine the Basic Optimal Strategy against an opponent 3-bet (or 4-bet etc.). The Basic Optimal Strategy for dealing with opponent re-raises is reliant on determining an accurate opponent Estimated Hand Range for any possible situation, then utilizing that Estimated Hand Range to calculate the payer's Weighted Average Equity (as per FIGS. 5A-5C). FIGS. 6A-6B provide a detailed description for how to utilize Weighted Average Equity to determine the optimal strategy for a player's response to an opponent 3-bet.

The following are 2 additional examples that illustrate the Basic Optimal Strategy decision making process when facing an opponent 3-bet:

1. All opponents fold to the button, who raises with Ace of hearts and Ace of diamonds. The small blind folds, then the big blind 3-bets (pot size raise). The big blind's Estimated Hand Range=1 to 21. So the button's Weighted Average Equity can be calculated as follows:

| Big Blind Estimated Hands | Possible Combinations | Button Equity with AA |
|---|---|---|
| AA | 1 | 50% |
| KK | 6 | 82% |
| AKs | 2 | 88% |
| QQ | 6 | 81% |
| JJ | 6 | 81% |
| AKo | 6 | 93% |
| AQs | 2 | 87% |
| 1010 | 6 | 81% |
| AQo | 6 | 93% |
| KQs | 4 | 83% |
| AJs | 2 | 87% |
| 99 | 6 | 81% |
| KJs | 4 | 82% |
| QJs | 4 | 81% |
| A10s | 2 | 87% |
| 88 | 6 | 81% |
| KQo | 12 | 87% |
| AJo | 6 | 92% |
| J10s | 4 | 79% |
| Q10s | 4 | 80% |
| K10s | 4 | 82% |
| Total | 99 | 85% |

99 total hand combinations within opponent Estimated Hand Range

Button has Weighted Average Equity~85%

Because 85% is greater than the 65% 4-bet with position threshold, the Basic Optimal Strategy would be for Button to make a pot size 4-bet.

2. Player has 8 opponents behind (no limpers) and raises with Queen of hearts and Queen of diamonds. Opponent with 7 opponents behind 3-bets, and all other opponents fold. Opponent's Estimated Hand Range=1 to 6. Player's Weighted Average Equity can be calculated as follows:

| Opponent Estimated Hands | Possible Combinations | Player Equity |
|---|---|---|
| AA | 6 | 19% |
| KK | 6 | 18% |
| AKs | 4 | 54% |
| QQ | 1 | 50% |
| JJ | 6 | 82% |
| AKo | 12 | 56% |
| Total | 35 | 47% |

35 total hand combinations within standard opponent Estimated Hand Range

Player has Weighted Average Equity~47%

Because 47% is greater than 36% but less than 63%, Basic Optimal Strategy would be for Player to call the opponent 3-Bet.

The Basic Optimal Strategy described thus far is optimal only if playing against opponents that are also playing according to the same Basic Optimal Strategy. However, many opponents do not play according to the Basic Optimal Strategy. Therefore, playing consistently optimal Texas Hold'em Poker requires numerous adjustments to the Basic Optimal Strategy based on a wide range of factors.

First and foremost, Opponent Analysis allows a player to categorize each opponent's playing style in order to determine when to adjust the Basic Optimal Strategy against that particular opponent. This is the fundamental principle of Exploitative poker strategy. FIG. 7 describes the 3 general categories of opponents: Loose, Optimal, and Tight.

All opponents are initially considered optimal. That is why the Basic Optimal Strategy applies to all hands when there is no hand history with an opponent. Over the course of play, through attentive observation of every opponent decision that takes place within each hand, optimal players categorize each opponent's decisions as either loose, optimal, or tight in various situations.

Based on the Expected Frequencies calculated in FIGS. 2A-2B, 3A-3C, 4A, 4I and 6A-6B, a player is able to gather data on opponent raise/call/fold frequencies as compared to the Expected Frequencies. Opponents that consistently raise/call/fold more (or less) often than Basic Optimal Strategy expectations are categorized accordingly. Those opponents' Estimated Hand Ranges will be adjusted based on their tendencies. And the Basic Optimal Strategy when playing against those opponents would be adjusted accordingly.

In addition to analyzing each opponent's betting statistics, optimal players must also analyze each opponent's playing style based on the opponent's cards that are exposed. When opponent cards are exposed at the completion of a hand, optimal players must count and categorize each mistake an opponent made during that hand. Opponent mistakes are considered significant deviations from the Basic Optimal Strategy, taking all adjustments into account. Keeping track and categorizing all opponent mistakes can be used in combination with each opponent's fold/call/raise statistics in order to determine how to best categorize each opponent. This method of Opponent Analysis will allow optimal players to determine how often and to what extent to adjust the Basic Optimal Strategy against each particular opponent. This is accomplished by further categorizing all non Basic Optimal Strategy opponents into the Detailed Opponent Categories described in FIG. 8.

In addition to Opponent Analysis, there are numerous additional "Adjustments" to the Basic Optimal Strategy that are required in order to play consistently optimal Texas Hold'em Poker. FIGS. 9A-9F describes many of these adjustments in detail, although additional adjustments may also be required. Each of the adjustments hated in FIGS. 9A-9F will affect the Basic Optimal Strategy decisions in various ways.

The final step to playing consistently optimal Texas Hold'em Poker is to determine how to play the seemingly infinite possible hand scenarios that can arise on the flop, turn, and river. The primary factor that determines all postflop decisions is a players Weighted Average Equity. FIGS. 10A-10B provide a general outline and examples of flop hand strength tiers, based on a hand's Weighted Average Equity against opponent Estimated Hand Ranges on the flop.

Basic Optimal Strategy bet/raise sizing on the flop should remain standard as a percentage of the pot size (similar to preflop raise sizing). The default bet/raise on the flop is ⅔ the pot size. Short stacks may require less than ⅔ pot bet/raise sizing. Deep stacks may require greater than ⅔ pot bet/raise sizing. Modifying the default bet size will also modify the optimal WAE ranges for postflop decisions.

Turn and river bet/raise sizing should ideally have multiple bet size options. However, using a default bet/raise size of ½ pot on the turn, and 40% pot on the river, can provide nearly optimal results. This simplified bet/raise sizing will also make it significantly easier for people to learn the Basic Optimal Strategy decision making process. FIG. 11 describes the default bet/raise size for each of the 4 rounds of betting.

The primary factor that determines all postflop Basic Optimal Strategy is a player's Weighted Average Equity, calculated using an accurate opponent Estimated Hand Range. Secondary factors that also affect postflop strategy are:

1. Number of active opponents in the hand
2. Who was the last aggressor (who raised/bet vs who checked/called).
3. Position Each of the Adjustments described in FIGS. 9A-9F are tertiary factors that may or may not adjust the postflop Basic Optimal Strategy.

FIGS. 12A-12Q outline the Basic Optimal Strategy strategy for all possible initial player decisions on the Flop. FIGS. 12A-12Q include decision trees that cover all possible WAE figures. (0-100%) and all possible secondary factors (listed above). Minor revisions to the WAE ranges from FIGS. 12A-12Q may be required.

Almost every decision an opponent makes during a hand will affect their Estimated Hand Range. FIGS. 13A-13C provide a more detailed example for the process of revising an opponent Estimated Hand Range. The opponent's revised Estimated Hand Range with likelihood weightings from FIGS. 13A-13C would be used to calculate the player's revised Weighted Average Equity on the Turn (4th community card). A similar process would apply on the River (fifth and final community card).

The methodology described herein can be applied to any possible situation that could potentially arise while playing any variation of Texas Hold'em Poker and against any number of opponents. Resulting in a fully automated computer algorithm that can play consistently optimal Poker in all possible scenarios. The algorithm contains elements of artificial intelligence in that it analyzes opponent decisions and makes adjustments to its strategy based on that analysis. The algorithm could also be programmed to play loose, tight, or various other player styles.

One embodiment of the invention involves the use of an electronic "Poker Trainer" that would allow the user to play a complete and genuine game of electronic poker against a computer and/or other live individuals, and to simultaneously utilize the features of the Poker Trainer to learn how to play consistently optimal poker. The Poker Trainer would display the various statistics and strategies presented herein in an easy to read manner while users are playing real poker against the computer and/or against other live players. This would allow users to learn how to play consistently optimal poker according to the detailed methodology presented during play. Some of the Poker Trainer's salient features are described in FIG. 14.

Another embodiment of the invention would be to utilize the unique and specific methodology presented herein to develop an artificially intelligent poker algorithm that is capable of independently playing consistently optimal poker against any number of opponents. The algorithm would be programmed to initially play according to the Basic Optimal Strategy. And the algorithm would be programmed to adjust the Basic Optimal Strategy based on Opponent Analysis and the various other Basic Optimal Strategy Adjustments from FIGS. 9A-9F.

An artificially intelligent algorithm that can independently play consistently optimal Poker has tremendous application potential throughout the Poker Industry. Although the description above contains many specific details, these should not be construed as limiting the scope of the embodiment. But merely as illustrations of some of the potential applications. The embodiments described above are meant solely as examples of the potential application, and in no way limit the scope of application. Thus, the scope of the invention should be construed broadly as set forth in the claims.

I claim:

1. A non-transient computer readable medium comprising program instructions for causing a computer to perform a method of:
   obtaining community card poker game data, the community card poker game data comprising estimated opponent hand data, player hand data, a number of opponents, turn order data, a pre-flop hand strength table, and a set of tells;
   calculating a player weighted average equity (WAE) against each opponent's estimated hand range based on the player hand data and the pre-flop hand strength table;
   determining if the player is a pre-flop raiser based on the turn order data;
   determining if the opponent is first to act and bets based on the turn order data if the player is determined to be the pre-flop raiser;
   determining a modified player WAE based on a set of more than three ranges of player WAE if the opponent is determined to be first to act and bets; and
   generating a post-flop decision from a set of post-flop decisions based on the modified player WAE, wherein each post-flop decision from the set of post-flop decisions has at least one corresponding modified player WAE range and the set of post-flop decisions consisting a call decision, a fold decision, and a raise decision, and wherein the call decision has two corresponding non-overlapping modified player WAE ranges and the raise decision and the fold decision have one corresponding modified player WAE range, and wherein the raise decision's corresponding range of modified player WAE is between the call decision's two non-overlapping ranges of modified player WAE; and
   wherein the number of opponents is one, wherein each of the more than three ranges of player WAE have a corresponding flop discount factor, and wherein at least one of the more than three ranges of player WAE has a corresponding flop discount factor that is based on a set of tells and with a value that ranges between 0 and 1.

2. The method of claim 1, wherein the community card poker is Texas hold'em poker.

3. The method of claim 1, wherein generating a decision from a set of decisions is further based on making adjustments to a strategy based on an analysis of the opponent.

4. The method of claim 3, wherein making adjustments to the strategy is based on an analysis of opponent prior betting statistics and exposed cards.

5. The method of claim 3, wherein adjustments to the strategy includes: Adjusting Opponent Estimated Hand Ranges, Raising more often against loose opponents, Calling more often against loose opponents, Folding more often against tight opponents, Bluffing more often against tight opponents, and Value betting more often against loose opponents.

6. The method of claim 1, wherein the number of ranges of player WAE in the set of more than three ranges of player WAE is four.

7. The method of claim 1, wherein the set of four ranges of player WAE consisting a first range of player WAE that corresponds to a folding decision, a second range of player WAE that corresponds to a calling decision, a third range of player WAE that corresponds to a raising decision, and a fourth range of player WAE that corresponds to a calling decision.

8. A non-transient computer readable medium comprising program instructions for causing a computer to perform a method of:
   obtaining community card poker game data, the community card poker game data comprising estimated opponent hand data, a number of opponents, turn order data, and a set of tells, wherein one of the tells is a decision time threshold;
   calculating a player weighted average equity (WAE) against each opponent's estimated hand range;
   determining if there is no pre-flop raiser based on the turn order data;
   determining if the opponent is first to act and bets based on the turn order data if no one is determined to be the pre-flop raiser;
   determining a modified player WAE based on a set of more than three ranges of player WAE if the opponent is determined to be first to act and bets; and
   generating a post-flop decision from a set of post-flop decisions based on the modified player WAE, wherein each post-flop decision from the set of post-flop decisions has at least one corresponding modified player WAE range and the set of post-flop decisions consisting a call decision, a fold decision, and a raise decision, and wherein the call decision has two corresponding non-overlapping modified player WAE ranges and the raise decision and fold decision have one corresponding modified player WAE range, and wherein the raise decision's corresponding range of modified player WAE is between the call decision's two non-overlapping ranges of modified player WAE; and wherein the number of opponents is one, and wherein each of the more than three ranges of player WAE have a corresponding flop discount factor, and wherein at least one of the more than three ranges of player WAE has a corresponding flop discount factor that is based on a set of tells and with a value that ranges between 0 and 1.

9. The method of claim 8, wherein the community card poker is Texas old'em poker.

10. The method of claim 8, wherein generating a decision from a set of decisions is further based on making adjustments to a strategy based on an analysis of the opponent.

11. The method of claim 10, wherein making adjustments to the strategy is based on an analysis of opponent prior betting statistics and exposed cards.

12. The method of claim 10, wherein adjustments to the strategy includes: Adjusting Opponent Estimated Hand Ranges, Raising more often against loose opponents, Calling more often against loose opponents, Folding more often against tight opponents, Bluffing more often against tight opponents, and Value betting more often against loose opponents.

13. The method of claim 8, wherein the number of ranges in the set of more than three ranges of player WAE is four.

14. The method of claim 8, wherein the set of four ranges of modified player WAE consisting a first range of modified player WAE that corresponds to a folding decision, a second range of modified player WAE that corresponds to a calling decision, a third range of modified player WAE that corresponds to a raising decision, and a fourth range of modified player WAE that corresponds to a calling decision.

* * * * *